(12) United States Patent
Maruyama et al.

(10) Patent No.: US 9,334,757 B2
(45) Date of Patent: May 10, 2016

(54) SINGLE-CASING STEAM TURBINE AND COMBINED CYCLE POWER PLANT OF SINGLE-SHAFT TYPE

(75) Inventors: Takashi Maruyama, Tokyo (JP); Asaharu Matsuo, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 822 days.

(21) Appl. No.: 13/571,653

(22) Filed: Aug. 10, 2012

(65) Prior Publication Data
US 2013/0216354 A1    Aug. 22, 2013

(30) Foreign Application Priority Data
Feb. 17, 2012    (JP) .................................. 2012-033262

(51) Int. Cl.
| | | |
|---|---|---|
| F01D 25/28 | (2006.01) | |
| F02C 6/18 | (2006.01) | |
| F02C 7/28 | (2006.01) | |
| F01K 23/10 | (2006.01) | |
| F01K 23/14 | (2006.01) | |
| F01D 25/24 | (2006.01) | |
| F02C 6/02 | (2006.01) | |

(52) U.S. Cl.
CPC ................ *F01D 25/28* (2013.01); *F01K 23/10* (2013.01); *F01K 23/14* (2013.01); *F02C 6/18* (2013.01); *F02C 7/28* (2013.01); *F01D 25/243* (2013.01); *F02C 6/02* (2013.01); *F05D 2220/31* (2013.01); *Y02E 20/16* (2013.01)

(58) Field of Classification Search
CPC ......... F01D 25/28; F01D 25/243; F02C 6/18; F02C 7/28; F02C 6/02; F01K 23/14; F01K 23/10; F05D 2220/31; Y02E 20/16
See application file for complete search history.

(56) References Cited

U.S. PATENT DOCUMENTS

| | | | |
|---|---|---|---|
| 4,961,310 A | 10/1990 | Moore et al. | |
| 5,780,932 A * | 7/1998 | Laffont | ............................ 290/52 |
| 6,976,680 B2 | 12/2005 | Uehara et al. | |
| 6,988,869 B2 * | 1/2006 | Haje | .............................. 415/104 |
| 8,347,499 B2 | 1/2013 | Grzondziel et al. | |
| 2003/0062686 A1 | 4/2003 | Uehara et al. | |

(Continued)

FOREIGN PATENT DOCUMENTS

| | | |
|---|---|---|
| CN | 1410691 A | 4/2003 |
| CN | 101480705 A | 7/2009 |

(Continued)

OTHER PUBLICATIONS

First Office Action issued Apr. 1, 2015 in corresponding Chinese Application No. 201280068547.4 (with English translation).

(Continued)

*Primary Examiner* — Arun Goyal
(74) *Attorney, Agent, or Firm* — Wenderoth, Lind & Ponack, L.L.P.

(57) ABSTRACT

A single-casing steam turbine has high-pressure blade rows and low-pressure blade rows and includes a high/intermediate-pressure chamber housing the high-pressure blade rows, a low-pressure chamber housing the low-pressure blade rows, and an expansion joint for connecting the high/intermediate-pressure chamber and the low-pressure chamber and for sealing an interior space of the high/intermediate-pressure chamber and the low-pressure chamber.

6 Claims, 8 Drawing Sheets

(56) References Cited

U.S. PATENT DOCUMENTS

| | | |
|---|---|---|
| 2009/0126190 A1 | 5/2009 | Grzondziel et al. |
| 2011/0030335 A1 | 2/2011 | Sanchez |

FOREIGN PATENT DOCUMENTS

| | | |
|---|---|---|
| CN | 101514641 A | 8/2009 |
| CN | 102140938 A | 8/2011 |
| DE | 39 41 089 | 6/1990 |
| JP | 58-156105 | 10/1983 |
| JP | 59-18207 | 1/1984 |
| JP | 1-280603 | 11/1989 |
| JP | 3-37305 | 2/1991 |
| JP | 4-132805 | 5/1992 |
| JP | 5-149106 | 6/1993 |
| JP | 7-158410 | 6/1995 |
| JP | 8-512380 | 12/1996 |
| JP | 9-32505 | 2/1997 |
| JP | 10-89013 | 4/1998 |
| JP | 11-36813 | 2/1999 |
| JP | 11-350914 | 12/1999 |
| JP | 2009-121477 | 6/2009 |

OTHER PUBLICATIONS

International Preliminary Report on Patentability issued Aug. 19, 2014 in corresponding International Application No. PCT/JP2012/068917 (with English translation).

Invitation to Pay Additional Fees and, Where Applicable, Protest Fee (Form PCT/ISA/206), issued Sep. 4, 2012 in corresponding International Application No. PCT/JP2012/068917.

International Search Report (Form PCT/ISA/210) issued Oct. 23, 2012 in corresponding International Application No. PCT/JP2012/068917.

International Search Report (Form PCT/ISA/206) issued Sep. 4, 2012 in corresponding International Application No. PCT/JP2012/068917 (with English translation).

Notification on the Grant of Patent Right for Invention issued Sep. 8, 2015 in corresponding Chinese Application No. 201280068547.4 (with English translation).

Extended European Search Report issued Nov. 3, 2015 in corresponding European Application No. 12868914.8.

* cited by examiner

FIG. 5 (PARTIAL ENLARGED VIEW OF SECTION "C" OF FIG. 4)
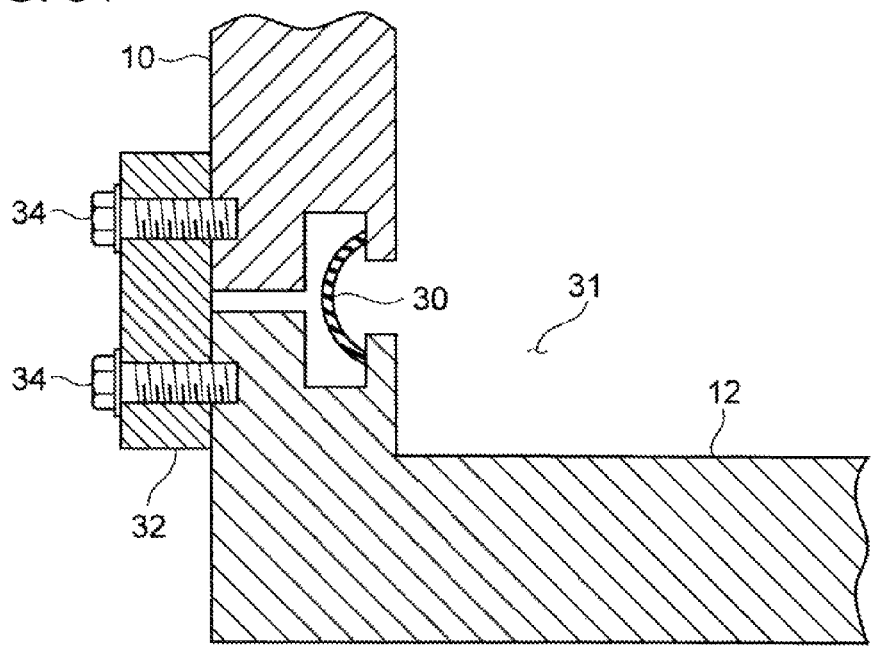
AXIAL DIRECTION OF ROTOR
FIG. 6
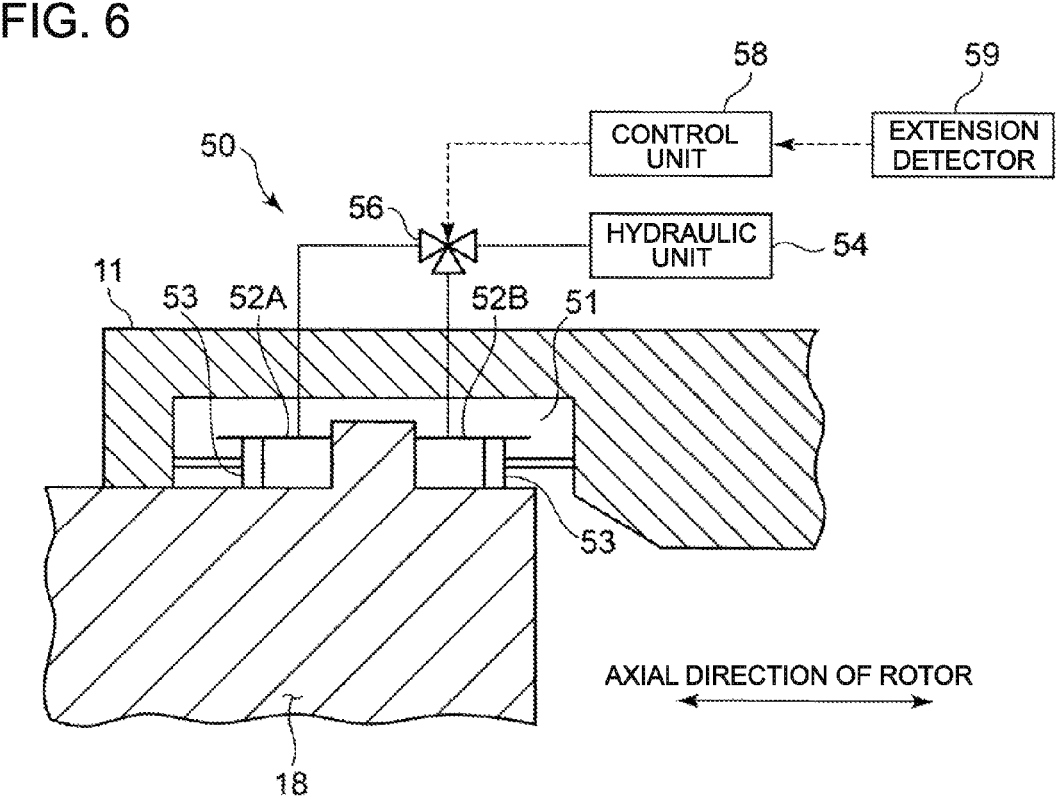
AXIAL DIRECTION OF ROTOR

SINGLE-CASING STEAM TURBINE AND COMBINED CYCLE POWER PLANT OF SINGLE-SHAFT TYPE

BACKGROUND

1. Technical Field

A present disclosure relates to a single-casing steam turbine and a single-shaft combined-cycle power plant using the single-casing steam turbine that are used in a power generating station or the like.

2. Background Art

As the steam turbine used in the power generating station or the like, a single-casing steam turbine (e.g. single-casing reheat turbine: SRT) is well known, which houses high-pressure blade rows and low-pressure blade rows in a single casing to achieve a shorter axial length and a compact steam turbine.

It is common in a steam turbine to set a clearance based on a fluctuation amount of the distance between a rotary part and a stationary part that is expected under an operation condition so that the rotary part and the stationary part do not contact with each other, and to arrange the rotary part with an offset with respect to the stationary part. This is due to the fact that temperature change of the steam turbine from a stopped state to a rated operation state causes a thermal extension difference between the rotor and the casing, which results in changing of the space between the rotary part and the stationary part.

Therefore, in the case of the single-casing steam turbine, a low-pressure chamber being the heaviest is fixed by an anchor and the overall casing (particularly, the high-pressure chamber and the intermediate-pressure chamber) is allowed to thermally extend freely from the anchor so as to prevent thermal deformation. Meanwhile, the rotor thermally extends from a thrust bearing which rotatably supports the rotor.

Therefore, from a perspective of reducing the thermal extension difference by making the rotor and the casing thermally extend in the same direction, it is necessary to arrange the low-pressure chamber on a side closer to the thrust bearing as the casing thermally extends from the anchor fixed to the low-pressure chamber and the rotor thermally extends from the thrust bearing.

However, by arranging the low-pressure chamber of the single-casing steam turbine on the side closer to the thrust bearing, the high-pressure chamber is inevitably arranged on a side farther from the thrust bearing. For a corresponding amount, the thermal extension difference between the high-pressure chamber and the rotor increases. Thus, it is necessary to provide a large clearance between the rotary part and the stationary part in the high-pressure chamber. However, the large clearance between the rotary part and the stationary part in the high-pressure chamber leads to a decrease in performance of high-pressure blade rows. A blade skeleton of the high-pressure blade rows housed in the high-pressure chamber is particularly small and thus the increased clearance between the rotary part and the stationary part in the high-pressure chamber leads to major decline in the performance of the high-pressure blade rows.

Therefore, for the purpose of reducing the clearance between the rotary part and the stationary part in the high-pressure chamber of the single-casing steam turbine, it is desired to develop a technique for suppressing the thermal extension difference between the high-pressure chamber and the rotor.

In recent years, a combined-cycle power plant with a combination of a steam turbine and a gas turbine is in the spotlight as a power plant used for a thermal power station and the like. The combined-cycle power plant includes a single-shaft power plant in which the steam turbine and the gas turbine are coupled on the same shaft to drive a common generator. In particular, a single-shaft combined-cycle power plant using a single-casing steam turbine has become one of today's mainstream power plants with increasing length of end blades in recent years.

In the single-shaft combined-cycle power plant using the single-casing steam turbine, the thrust bearing is arranged between the steam turbine and the gas turbine and the rotor thermally extends from the thrust bearing. Thus, from a perspective of making the rotor and the casing thermally extend in the same direction, the low-pressure chamber fixed by the anchor from which the casing thermally extends, is arranged on the side closer to the thrust bearing from which the rotor thermally extends, i.e. toward the gas turbine. Therefore, in the single-shaft combined-cycle power plant using the single-casing steam turbine, it is inevitable to secure a large clearance between the rotary part and the stationary part in the high-pressure chamber with respect to the blade skeleton of the high-pressure blade rows in correspondence to the large thermal extension difference between the rotor and the high-pressure chamber arranged on the side farther from the thrust bearing. This generates an issue of the performance decline of the high-pressure blade rows.

Particularly, the combined-cycle power plant is normally arranged in a large-scale thermal power station and the steam turbine is axially large in length. Therefore, in the combined-cycle power plant using the single-casing steam turbine, it is necessary to set the clearance considerably large between the rotary part and the stationary part in the high-pressure chamber and thus the issue of the performance decline of the high-pressure blade rows tends to occur.

In this regard, Patent Literature 1 discloses a space-adjusting unit for adjusting the space between the stationary part and the rotary part of the steam turbine although this is not intended for use in the single-casing steam turbine. In the space-adjusting unit, axial shifting of a flange part projecting from the rotor is detected by an extension difference detector and the casing of the steam turbine is moved by a hydraulic jack based on a detection signal from the extension difference detector.

CITATION LIST

Patent Literature

[PTL 1]
JP 59-18207 A

Technical Problem

The space-adjusting unit described in Patent Literature 1 is not intended for use in the single-casing steam turbine having high-pressure blade rows and low-pressure blade rows housed in a single casing. In the case of the single-casing steam turbine whose casing as a whole is heavy, there occurs issues such as an increased size of a hydraulic unit for moving the casing using the hydraulic jack in the same manner as the space-adjusting unit of Patent Literature 1.

Therefore, it is difficult to suppress the performance decline of the high-pressure blade rows by adjusting the space between the high-pressure chamber and the rotor by means of the space-adjusting unit disclosed in Patent Literature 1.

SUMMARY

In view of the above issues, it is an object of at least one embodiment of the present invention to provide a single-casing steam turbine and a single-shaft combined-cycle power plant, that are capable of suppressing the performance decline of the high-pressure blade rows.

Solution to Problem

A single-casing steam turbine according to at least one embodiment of the present invention, comprises:
blade rows including at least high-pressure blade rows and low-pressure blade rows;
a high-pressure chamber housing the high-pressure blade rows;
a low-pressure chamber housing the low-pressure blade rows; and
an expansion joint connecting the high-pressure chamber and the low-pressure chamber to each other and sealing an interior space of the high-pressure chamber and the low-pressure chamber.

In the present description, "single-casing steam turbine" indicates a steam turbine having blade rows including at least high-pressure blade rows and low-pressure blade rows that are housed in a single casing, and "high-pressure chamber" indicates a part where blade rows excluding the low-pressure blade rows are housed. For instance, the single-casing steam turbine may include intermediate-pressure blade rows in addition to the high-pressure blade rows and the low-pressure blade rows. In this case, the high-pressure chamber houses the high-pressure blade rows and the intermediate-pressure blade rows.

Further, "expansion joint" indicates a joint that is capable of sealing an interior space of the casing and absorbing the thermal extension of the high/intermediate-pressure chamber and/or the low-pressure chamber. For instance, the expansion joint may be constituted of an elastic member or bellows, which can be deformed in response to the thermal extension.

According to the above single-casing steam turbine, by connecting the high-pressure chamber and the low-pressure chamber by the expansion joint, the high-pressure chamber can be arranged on the side closer to the thrust bearing from which the rotor thermally extends. More specifically, the high-pressure chamber is separated from the low-pressure chamber fixed by the anchor and thus the high-pressure chamber thermally expands independently. Thus, the high-pressure chamber can be arranged on the side closer to the thrust bearing without causing the casing and the rotor to thermally extend in opposite directions. As a result, with the high-pressure chamber being arranged on the side closer to the thrust bearing, the thermal extension difference between the high-pressure chamber and the rotor is suppressed and thus it is possible to reduce the clearance between the rotary part and the stationary part in the high-pressure chamber and to suppress the performance decline of the high-pressure blade rows.

In some embodiments, the single-casing steam turbine further comprises a position-adjusting unit for adjusting a position of the high-pressure chamber in an axial direction of a rotor.

By adjusting the position of the high-pressure chamber by means of the position-adjusting unit, even when the clearance between the rotary part and the stationary part is comparatively small in the high-pressure chamber, the thermal extension difference between the high-pressure chamber and the rotor can be canceled out. Therefore, the rotary part and the stationary part are prevented from contacting each other. As a result, it is possible to further reduce the clearance between the rotary part and the stationary part in the high-pressure chamber and to reliably suppress the performance decline of the high-pressure blade rows.

Further, the thermal extension difference between the high-pressure chamber and the rotor can be offset and the rotary part and the stationary part are prevented from contacting each other. Therefore, even in the case where the low-pressure chamber fixed by the anchor is arranged on the side closer to the thrust bearing, from which the rotor thermally extends, in the manner similar to the conventional case, it is possible to reduce the clearance between the rotary part and the stationary part in the high-pressure chamber and to reliably suppress the performance decline of the high-pressure blade rows.

Furthermore, the position of the high-pressure chamber can be adjusted by the position-adjusting unit as the low-pressure chamber being the heaviest section is separated from the high-pressure chamber in the above single-casing steam turbine. More specifically, it is possible to easily adjust the position of the high-pressure chamber, which is relatively lightweight, as a single unit using a position-adjusting unit constituted by known actuators such as hydraulic jacks.

In some embodiments, the position-adjusting unit comprises:
a pair of hydraulic cylinders for moving a casing support part of the high-pressure chamber in opposite directions along the axial direction of the rotor, the pair of hydraulic cylinders being attached to the casing support part of the high-pressure chamber;
a hydraulic unit for supplying a hydraulic pressure to the pair of hydraulic cylinders; and
a switching valve for switching a hydraulic cylinder to be supplied with the hydraulic pressure between the pair of hydraulic cylinders, the switching valve being provided between the pair of hydraulic cylinders and the hydraulic unit.

The hydraulic cylinder to be used is switched by the switching valve so as to move the high-pressure chamber backward and forward along the axial direction of the rotor. As a result, it is possible to cancel out the thermal extension difference between the high-pressure chamber and the rotor in accordance with the operation state of the steam turbine (such as when the temperature is increasing or decreasing), thereby preventing the rotary part and the stationary part from contacting each other.

In some embodiments, the above single-casing steam turbine further comprises:
a detection unit for detecting a thermal extension difference between the rotor and the high-pressure chamber; and
a control unit for controlling the position-adjusting unit based on the thermal extension difference detected by the detection unit.

As a result, it is possible to reliably prevent the rotary part and the stationary part from contacting each other by adjusting the position of the high-pressure chamber so as to cancel out the thermal extension difference between the rotor and the high-pressure chamber.

In some embodiments, the rotor may include, in the outside of a casing of the steam turbine, a disk part where the rotor has a shaft diameter different from the rest of the rotor or a taper surface where the rotor changes in diameter, and the detection unit may include a sensor for measuring a distance to an end surface of the disk part or the taper surface of the rotor.

A single-shaft combined cycle power plant according to at least one embodiment of the present invention, comprises a generator, the single-casing steam turbine described above, a gas turbine that are coupled in this order. In the single-shaft combined cycle power plant, a thrust bearing is provided between the gas turbine and the steam turbine, the high-pressure chamber is arranged closer to the thrust bearing than the low-pressure chamber in a casing of the steam turbine, and the low-pressure chamber is fixed by an anchor.

According to this single-shaft combined cycle power plant, the high-pressure chamber is arranged on the side closer to the thrust bearing from which the rotor thermally extends and thus the thermal extension difference between the high-pressure chamber and the rotor can be suppressed. Therefore, it is possible to suppress the performance decline of the high-pressure blade rows by reducing the clearance between the rotary part and the stationary part in the high-pressure chamber.

The high-pressure chamber can be arranged on the side closer to the thrust bearing in the above manner, as the low-pressure chamber fixed by the anchor and the high-pressure chamber are separated and the arrangement of the high-pressure chamber on the side closer to the thrust bearing does not cause the casing and the rotor to thermally extend in opposite directions.

In some embodiments, a position-adjusting unit is provided for adjusting a position of the high-pressure chamber in the axial direction of the rotor.

By adjusting the position of the high-pressure chamber by means of the position-adjusting unit, even when the clearance between the rotary part and the stationary part is comparatively small in the high-pressure chamber, the thermal extension difference between the high-pressure chamber and the rotor can be canceled out. Therefore, the rotary part and the stationary part are prevented from contacting each other. As a result, it is possible to further reduce the clearance between the rotary part and the stationary part in the high-pressure chamber and to reliably suppress the performance decline of the high-pressure blade rows.

Alternatively, in some embodiments, a single-shaft combined cycle power plant comprises a generator, the single-casing steam turbine described above, and a gas turbine that are coupled in this order. In this single-shaft combined cycle power plant, a thrust bearing is provided between the gas turbine and the steam turbine, the low-pressure chamber is arranged closer to the thrust bearing than the high-pressure chamber in a casing of the steam turbine, the combined cycle power plant may further comprises a position-adjusting unit for adjusting a position of the high-pressure chamber in an axial direction of a rotor, and the low-pressure chamber is fixed by an anchor.

By providing the position-adjusting unit, the thermal extension difference between the high-pressure chamber and the rotor is canceled out so as to prevent the rotary part and the stationary part from contacting each other. Therefore, even in the case where the low-pressure chamber fixed by the anchor is arranged on the side closer to the thrust bearing from which the rotor thermally extends, it is still possible to reduce the clearance between the rotary part and the stationary part in the high-pressure chamber and to reliably suppress the performance decline of the high-pressure blade rows.

Advantageous Effects

According to at least one embodiment of the present invention, by connecting the high-pressure chamber and the low-pressure chamber by the expansion joint, the high-pressure chamber can be arranged on the side closer to the thrust bearing from which the rotor thermally extends. More specifically, the high-pressure chamber is separated from the low-pressure chamber fixed by the anchor and thus the high-pressure chamber thermally expands independently. Thus, the high-pressure chamber can be arranged on the side closer to the thrust bearing without causing the casing and the rotor to thermally extend in opposite directions. As a result, with the high-pressure chamber being arranged on the side closer to the thrust bearing, the thermal extension difference between the high-pressure chamber and the rotor is suppressed and thus it is possible to reduce the clearance between the rotary part and the stationary part in the high-pressure chamber and to suppress the performance decline of the high-pressure blade rows.

Further, in the case of providing the position-adjusting unit for adjusting the position of the high-pressure chamber in the axial direction of the rotor according to some embodiments, the thermal extension difference between the high-pressure chamber and the rotor can be offset and the rotary part and the stationary part are prevented from contacting each other. Therefore, even in the case where the low-pressure chamber fixed by the anchor is arranged on the side closer to the thrust bearing, from which the rotor thermally extends, in the manner similar to the conventional case, it is possible to reduce the clearance between the rotary part and the stationary part in the high-pressure chamber and to reliably suppress the performance decline of the high-pressure blade rows.

BRIEF DESCRIPTION OF DRAWINGS

FIG. 5 is a cross-sectional view of a connection section between a high/intermediate-pressure chamber and a low-pressure chamber of the steam turbine according to the embodiment.

FIG. 6 is a diagram illustrating a position-adjusting unit for adjusting a position of the high/intermediate-pressure chamber according to another embodiment.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

A steam turbine for a single-shaft combined-cycle power plant according to a first embodiment is now described.

Figure 1:
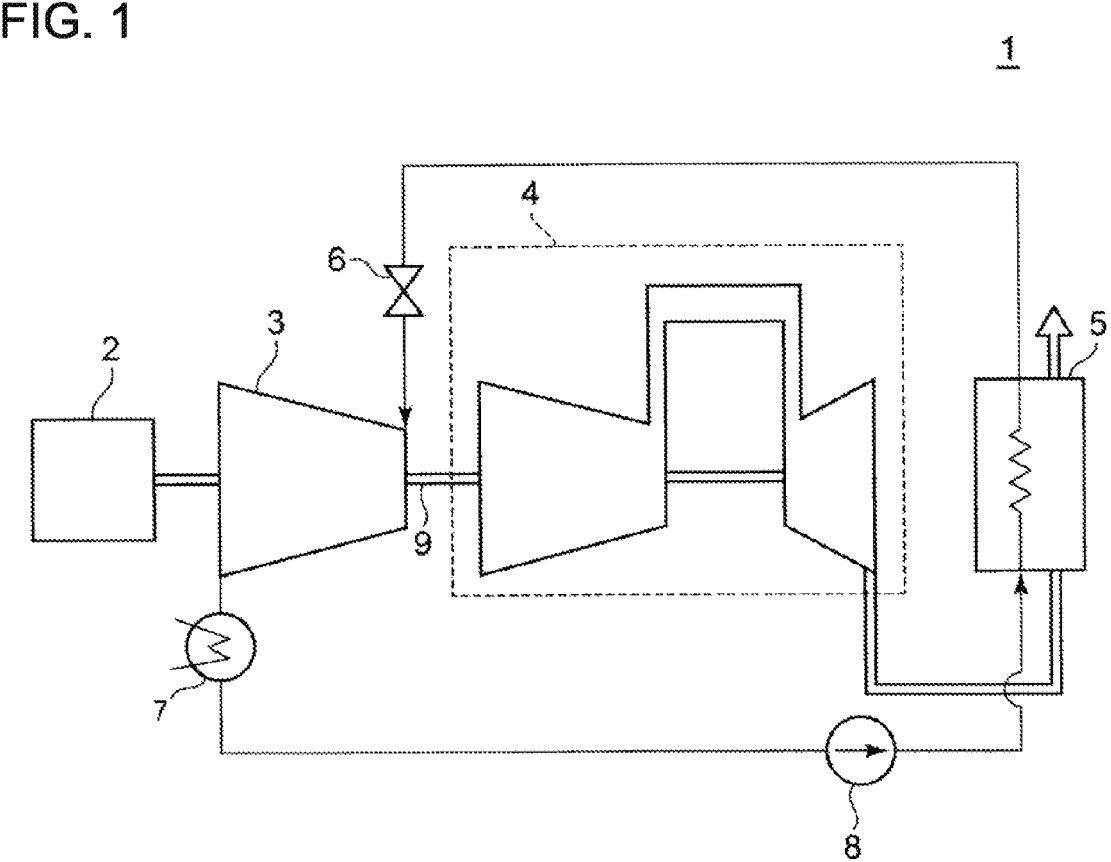
FIG. 1 is a block diagram schematically illustrating a configuration of a single-shaft combined-cycle power plant according to an embodiment.
Figure 2:
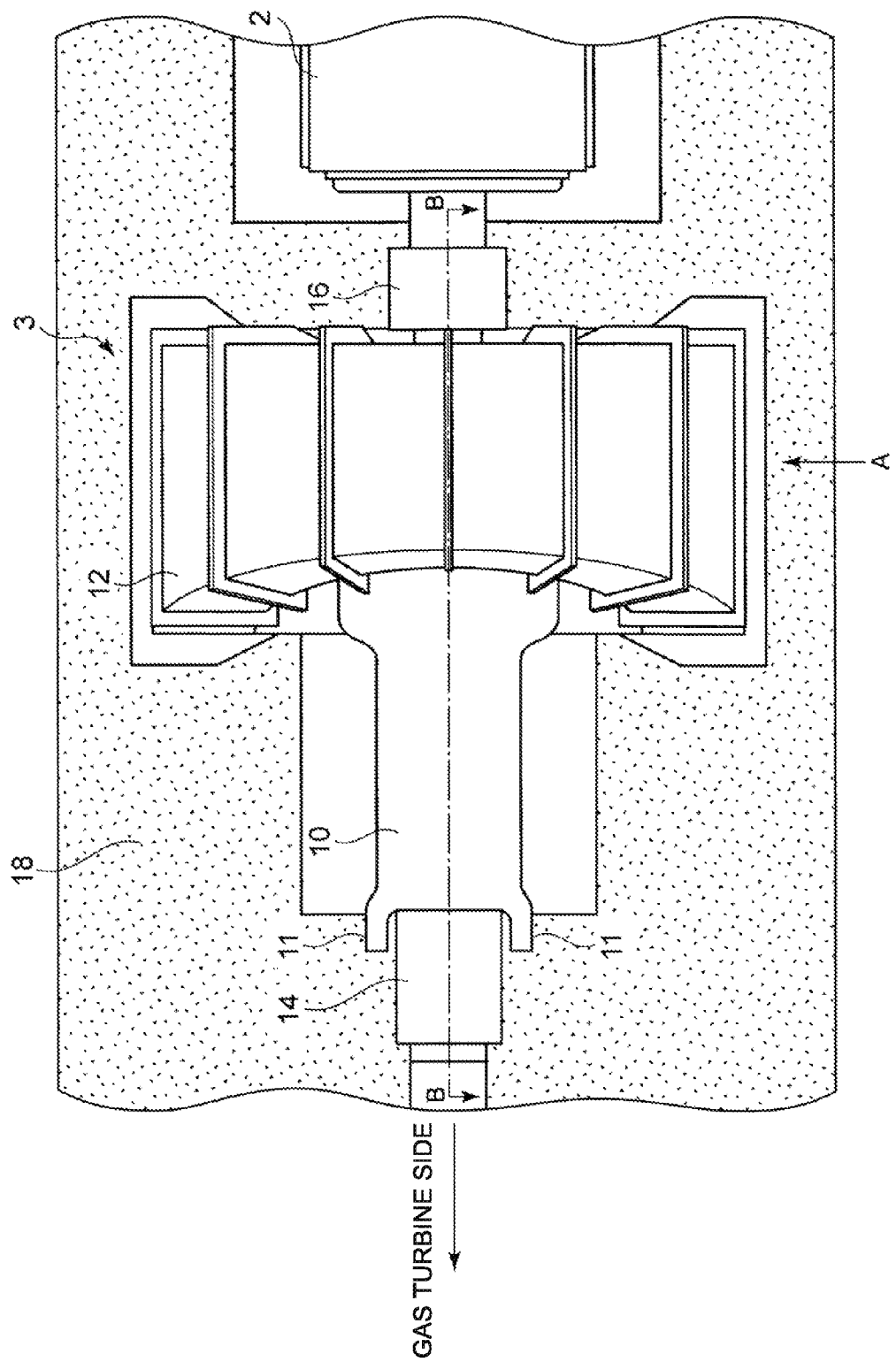
FIG. 2 is a top view of a steam turbine of the single-shaft combined-cycle power plant according to the embodiment.
Figure 3:
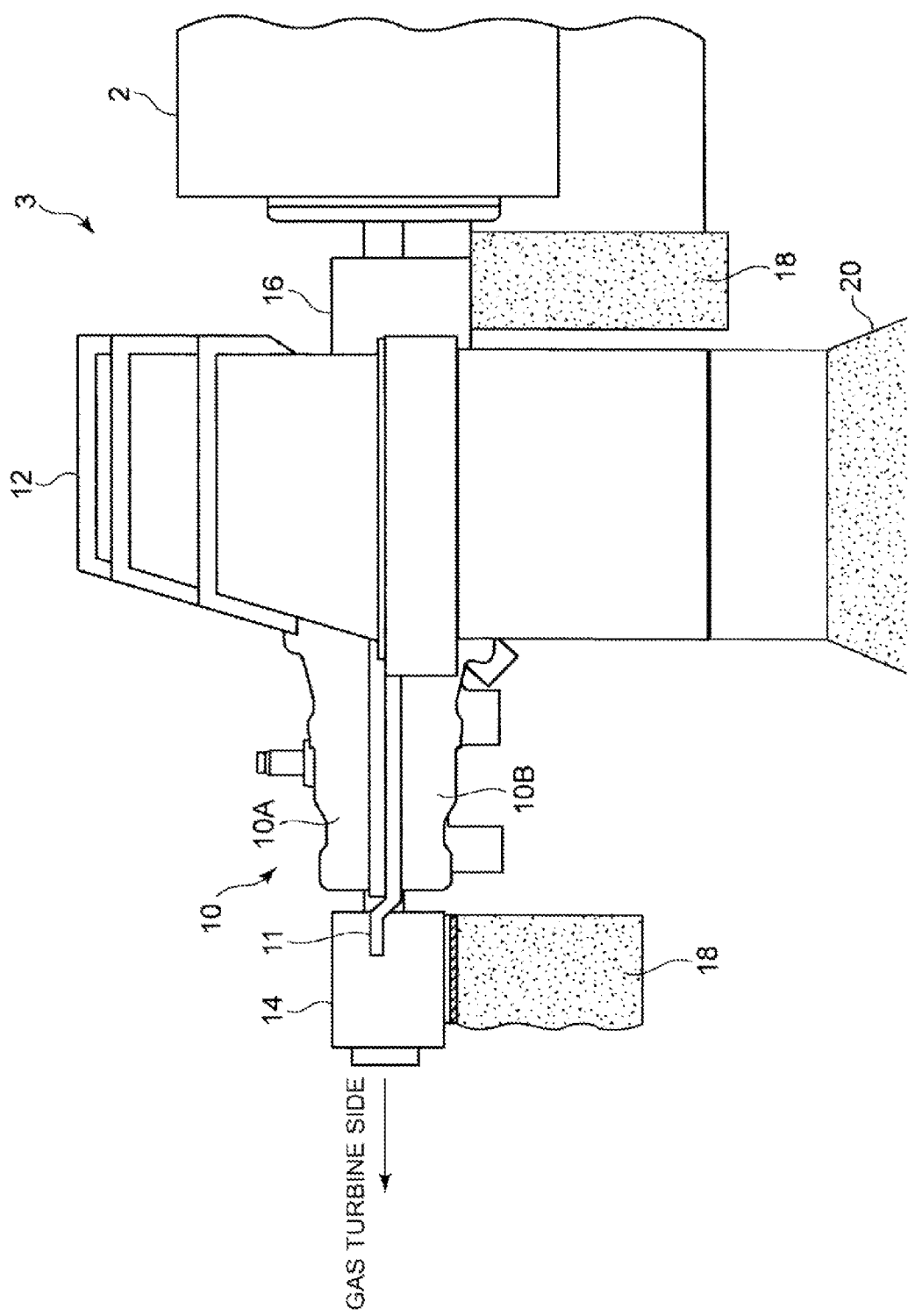
FIG. 3 is a side view taken from a direction of an arrow A of FIG. 2.
Figure 4:
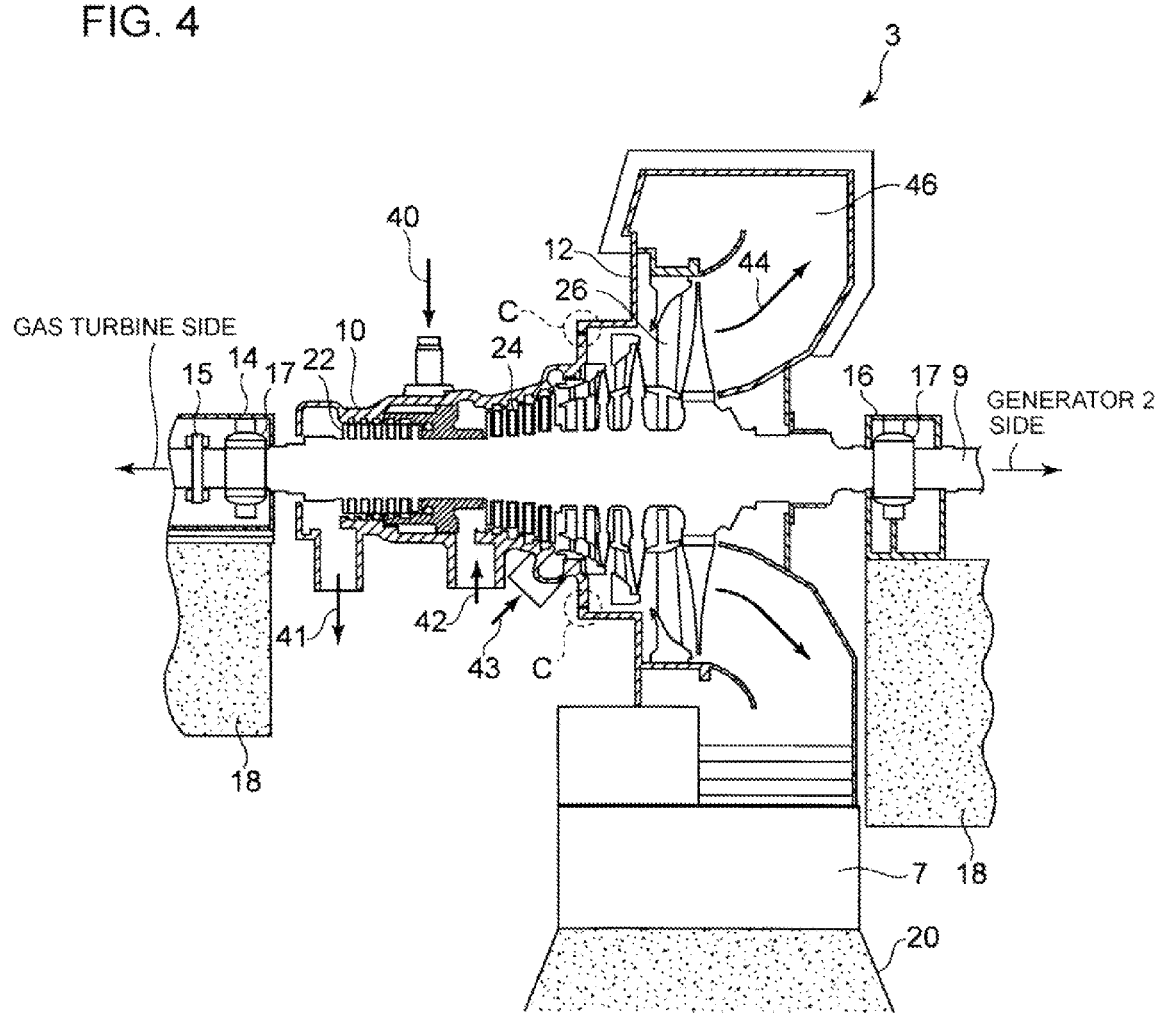
FIG. 4 is a cross-sectional view taken along a line B-B of FIG. 2.

FIG. 1 is a block diagram schematically illustrating a configuration of a single-shaft combined-cycle power plant according to an embodiment. FIG. 2 is a top view of a steam turbine of the single-shaft combined-cycle power plant according to the embodiment. FIG. 3 is a side view taken from a direction of an arrow A of FIG. 2. FIG. 4 is a cross-sectional view taken along a line B-B of FIG. 2. FIG. 5 is a cross-sectional view of a connection section (a bottom one of the two sections indicated as C in FIG. 4) between a high/intermediate-pressure chamber and a low-pressure chamber of the steam turbine according to the embodiment.

As shown in FIG. 1, in the single-shaft combined-cycle power plant 1, a generator 2, a steam turbine 3 and a gas turbine 4 are arranged on the same shaft (a rotor 9) in this order.

The exhaust gas exhausted from the gas turbine 4 is supplied to an exhaust heat recovery boiler 5. In the exhaust heat recovery boiler 5, feed-water is heated by heat exchange with the exhaust gas from the gas turbine 4, thereby generating steam. The steam is then supplied to the steam turbine 3 via a steam-governing valve 6. Then, the steam having performed the work in the steam turbine 3 is condensed in a condenser 7 and then recirculated to the exhaust heat recovery boiler 5 by a feed-water pump 8 while the generator 2 is driven by the steam turbine 3 and the gas turbine 4.

The steam turbine 3 includes a high/intermediate-pressure chamber 10 and a low-pressure chamber 12 as shown in FIG. 2 and FIG. 3. FIG. 4 shows the high/intermediate-pressure chamber 10 housing high-pressure blade rows 22 and intermediate-pressure blade rows 24, and the low-pressure chamber 12 housing low-pressure blade rows 26. In the steam turbine 3, the high/intermediate-pressure chamber 10 and the low-pressure chamber 12 are connected to each other in a single casing. Further, the configuration of a connection section C (see FIG. 4) between the high/intermediate-pressure chamber 10 and the low-pressure chamber 12 is described later in reference to FIG. 5.

As shown in FIG. 2 to FIG. 4, a first bearing housing 14 is provided between the gas turbine 4 and the steam turbine 3 and a second bearing housing 16 is provided between the steam turbine 3 and the generator 2. The first bearing housing 14 houses a thrust bearing 15 and a radial bearing 17. The second bearing housing 16 houses a radial bearing 17. The thrust bearing 15 and the radial bearings 17 support the rotor 9 axially at both ends of the casing (the high/intermediate-pressure chamber 10 and the low-pressure chamber 12) of the steam turbine 3. The first bearing housing 14 and the second bearing housing 16 are installed on a foundation 18.

As shown in FIG. 3, the low-pressure chamber 12 of the steam turbine 3 is fixed by an anchor 20. In contrast, the high/intermediate-pressure chamber 10 has a halved structure separable into an upper chamber 10A and a lower chamber 10B. The high/intermediate-pressure chamber 10 is supported by the foundation 18 via a casing support part 11 projecting from the lower chamber 10B (however, the state of the casing support part 11 being supported by the foundation 18 is not illustrated in FIG. 3 which shows a cross-section of the foundation 18 taken along a vertical plane passing through a center axis of the rotor. The state of the casing support part 11 being supported by the foundation 18 is illustrated in FIG. 2 and FIG. 6 that is described later.).

As shown in FIG. 4, high-pressure steam 40 generated in the exhaust heat recovery boiler 5 (see FIG. 1) enters the high/intermediate-pressure chamber 10 and performs the work in the high-pressure blade rows 22 and exists as high-pressure exhaust steam 41. The high-pressure exhaust steam 41 is heated in a reheater (not shown) and then enters the high/intermediate-pressure chamber 10 again as reheat steam 42 and performs the work in the intermediate-pressure blade rows 24. In contrast, low-pressure steam 43 enters the low-pressure chamber 12 and performs the work in the low-pressure blade rows 26 and then is lead to the condenser 7 as the low-pressure exhaust steam 44 via an exhaust hood 46.

In the combined-cycle power plant 1 having the above structure, in this embodiment, the high/intermediate-pressure chamber 10 is arranged on the side closer to the gas turbine 4, i.e. on the side closer to the thrust bearing 15 from which the rotor 9 thermally extends. As a result, the thermal extension difference between the high/intermediate-pressure chamber 10 and the rotor 9 is suppressed and thus the clearance between the rotary part (blade rows) and the stationary part (vane rows) in the high/intermediate chamber 10 can be set smaller. Thus, it is possible to suppress the performance decline of the high-pressure blade rows 22.

To achieve the above arrangement of the high/intermediate-pressure chamber 10 on the side closer to the thrust bearing 15, the high/intermediate-pressure chamber 10 and the low-pressure chamber 12 are separated and are connected by providing an expansion joint 30 therebetween. By separating the high/intermediate-pressure chamber 10 from the low-pressure chamber 12 fixed by the anchor 20, the high/intermediate-pressure chamber 10 and the rotor 9 do not thermally extend in opposite directions although the high/intermediate-pressure chamber 10 is arranged on the side closer to the thrust bearing 15. As a result, it is possible to achieve the above arrangement of the high/intermediate-pressure chamber 10 on the side closer to the thrust bearing 15.

The expansion joint 30 seals an interior space 31 of the casing (the high/intermediate-pressure chamber 10 and the low-pressure chamber 12) of the steam turbine 3. The expansion joint 30 is also capable of absorbing thermal extension of the high/intermediate-pressure chamber 10 and/or the low-pressure chamber 12. For instance, the expansion joint 30 may be constituted of an elastic member or bellows, which can be deformed in response to the thermal extension.

When disassembling the steam turbine 3 for periodical inspection, the high/intermediate-pressure chamber 10 and the low-pressure chamber 12 are rigidly fixed by a connecting block 32 and a fixing bolt 34 and the entire casing can be hoisted by a crane. In contrast, when operating the steam turbine 3, the high/intermediate-pressure chamber 10 and the low-pressure chamber 12 can be separated by removing the fixing bolt 34 or removing the connecting block 32 itself and the thermal extension of the high/intermediate-pressure chamber 10 and/or the low-pressure chamber 12 can be absorbed by the expansion joint 30.

As described above, in the single-shaft combined-cycle power plant 1 according to the first embodiment in which the generator 2, the single-casing steam turbine 3 and the gas turbine 4 are connected in this order, the high/intermediate-pressure chamber 10 and the low-pressure chamber 12 of the steam turbine 3 are connected by the expansion joint 30, the thrust bearing 15 is provided between the gas turbine 4 and the steam turbine 3, the high/intermediate-pressure chamber 10 is arranged closer to the thrust bearing 15 than the low-pressure chamber 12 in the casing of the steam turbine 3, and the low-pressure chamber 12 is fixed by the anchor 20.

According to the first embodiment, the high/intermediate-pressure chamber 10 is arranged on the side closer to the thrust bearing 15 from which the rotor 9 thermally extends and thus the thermal extension difference between the high/intermediate-pressure chamber 10 and the rotor 9 can be suppressed. As a result, the clearance between the rotary part and the stationary part in the high/intermediate-pressure chamber 10 can be reduced and the performance decline of the high-pressure blade rows 22 can be suppressed.

A steam turbine for the single-shaft combined-cycle power plant according to a second embodiment is described. The steam turbine of this embodiment has components in common with the steam turbine 3 of the first embodiment except for a position-adjusting unit for adjusting a position of the high/intermediate-pressure chamber 10 in the axial direction of the rotor. Therefore, components different from the first embodiment are mainly described while the components in common with the first embodiment are not further described.

FIG. 6 is a diagram illustrating the position-adjusting unit for adjusting the position of the high/intermediate-pressure chamber 10 according to this embodiment. As shown in FIG. 6, the position-adjusting unit 50 includes a pair of hydraulic cylinders 52 (52A, 52B) attached to the casing support part 11 of the high/intermediate-pressure chamber 10 (see FIG. 2 and FIG. 3), a hydraulic unit 54 for supplying a hydraulic pressure to the hydraulic cylinders 52, and a switching valve 56 for switching a hydraulic cylinder 52 to be supplied with the hydraulic pressure between the pair of hydraulic cylinders 52.

The pair of hydraulic cylinders 52 (52A, 52B) is attached to the casing support 11 opposite to each other. More specifically, piston parts 53 of the hydraulic cylinders 52 (52A, 52B) are attached to an inner wall surface of a recessed portion 51 formed in the casing support part 11.

When the hydraulic pressure is supplied to the hydraulic cylinder 52A, the casing support part 11 moves leftward in FIG. 6 along the axial direction of the rotor. In contrast, when the hydraulic pressure is supplied to the hydraulic cylinder 52B, the casing support part 11 moves rightward in FIG. 6 along the axial direction of the rotor. The hydraulic piston 53 is supported by the foundation 18 so as not to move upon receiving reaction force from the casing support part 11. Further, a relief valve (not shown) is provided so that, when one of the hydraulic cylinders 52 is supplied with the hydraulic pressure, a pressure inside the other of the hydraulic cylinders 52 does not get excessively high.

As the hydraulic unit 54, a hydraulic pump is used, for instance. The switching valve 56 is a three-way valve connected to the hydraulic cylinders 52 (52A, 52B) and the hydraulic unit 54.

Further, a control unit 58 is provided for controlling the switching valve 56 and a differential expansion indicator 59 is provided for detecting a thermal extension difference between the high/intermediate-pressure chamber 10 and the rotor 9. The control unit 58 controls the switching valve 56 based on the thermal extension difference detected by the differential expansion indicator 59, so as to switch a hydraulic cylinder to be supplied with the hydraulic pressure generated in the hydraulic unit 54.

For instance, in such a case that the high/intermediate-pressure chamber 10 extends rightward in FIG. 6 with respect to the rotor 9, the control unit 58 controls the switching valve 56 based on the detection result of the differential expansion indicator 59 so as to supply the hydraulic pressure to the hydraulic cylinder 52A and to move the casing support part 11 leftward in FIG. 6. As a result, the thermal extension difference between the high/intermediate-pressure chamber 10 and the rotor 9 is canceled out, thereby preventing the rotary part and the stationary part from contacting each other in the high/intermediate-pressure chamber 10.

Figure 7A:
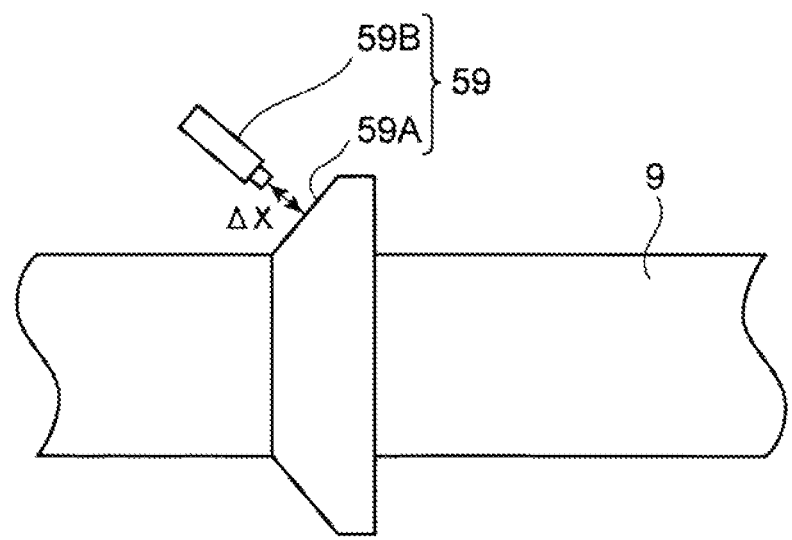
FIG. 7A is an illustration of a differential expansion indicator according to an embodiment.
Figure 7B:
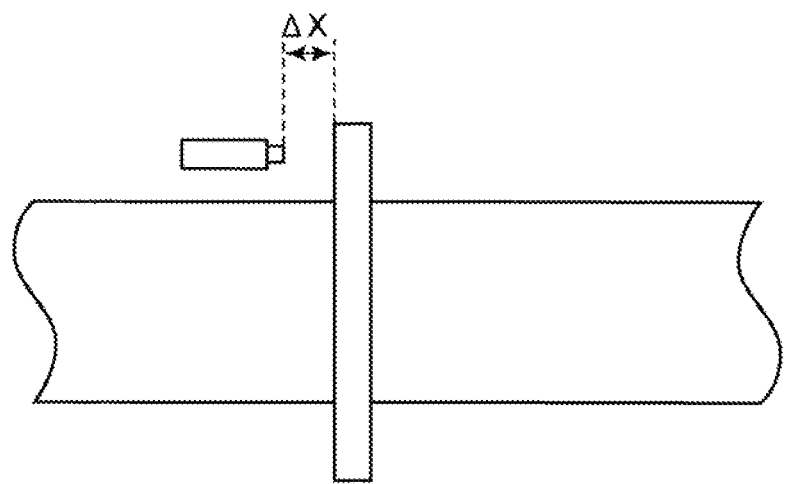
FIG. 7B is an illustration of a differential expansion indicator according to another embodiment.

FIG. 7A and FIG. 7B are illustrations of the differential expansion indicator 59 according to this embodiment. As shown in FIG. 7A, the differential expansion indicator 59 includes a taper surface 59A which is formed on the rotor 9 and whose diameter changes, and a non-contact sensor 59B arranged opposite to the taper surface 59A. The taper surface 59A and the non-contact sensor 59B are provided outside the casing of the steam turbine 3. The non-contact sensor 59B measures a distance ΔX to the taper surface 59A to calculate a thermal extension amount of the rotor from the distance ΔX. Alternatively, as shown in FIG. 7B, a disk part 59C may be provided on the rotor 9. The disk part 59C has a diameter different from the rest of the rotor 9. The thermal extension amount of the rotor 9 may be calculated from the distance ΔX to the disk part 59C measured by non-contact sensor 59B.

By calculating a difference between the calculated thermal extension amount of the rotor 9 and a thermal extension amount of the casing of the steam turbine 3, which is separately measured, the thermal extension difference between the rotor 9 and the high/intermediate-pressure chamber 10 is obtained. Alternatively, in such a case that the non-contact sensor 59B is directly or indirectly fixed to the casing of the steam turbine 3 (e.g. in such a case that the non-contact sensor 59B is fixed to the bearing housing integrally formed with the casing), the thermal extension difference between the rotor 9 and the high/intermediate-pressure chamber 10 may be directly obtained from the distance ΔX measured by the non-contact sensor 59B (see FIG. 7A and FIG. 7B).

According to the second embodiment, the position-adjusting unit 50 is provided so as to freely adjust the position of the high/intermediate-pressure chamber 10 in the axial direction of the rotor 9. Thus, even if the clearance between the rotary part and the stationary part is comparatively small in the high/intermediate-pressure chamber 10, the thermal extension difference between the high/intermediate-pressure chamber 10 and the rotor 9 can be canceled out, thereby preventing the rotary part and the stationary part from contacting each other. As a result, it is possible to further reduce the clearance between the rotary part and the stationary part in the high/intermediate-pressure chamber 10 and to reliably suppress the performance decline of the high-pressure blade rows 22.

The position of the high/intermediate-pressure chamber 10 can be adjusted by the position-adjusting unit 50 as the low-pressure chamber 12 being the heaviest section is separated from the high/intermediate-pressure chamber 10 (the high/intermediate-pressure chamber 10 and the low-pressure chamber 12 are connected via the expansion joint 30) in the steam turbine 3. More specifically, it is possible to adjust the position of the high/intermediate-pressure chamber 10, which is relatively lightweight, as a single unit by the position-adjusting unit 50 using the hydraulic pressure.

Further, by switching a hydraulic-pressure supply state of the pair of hydraulic cylinders 52 (52A, 52B) using the switching valve 56, the high/intermediate-pressure chamber 10 (i.e. the casing support part 11) can be moved in both directions along the axial direction of the rotor 9. As a result, it is possible to offset the thermal extension difference between the high/intermediate-pressure chamber 10 and the rotor 9 when the temperature is increasing or decreasing, thereby preventing the rotary part and the stationary part from contacting each other.

Particularly, the switching valve 56 is controlled by the control unit 58 based on the detection result of the thermal extension difference between the high/intermediate-pressure chamber 10 and the rotor 9, which has been detected by the differential expansion indicator 59. As a result, it is possible to reliably prevent the rotary part and the stationary part from contacting each other by positively canceling out the thermal extension difference between the high/intermediate-pressure chamber 10 and the rotor 9.

A steam turbine for the single-shaft combined-cycle power plant according to a third embodiment is described. The steam turbine of this embodiment has components in common with the steam turbine 3 of the first embodiment except for the position-adjusting unit 50 for adjusting the position of the high/intermediate-pressure chamber 10 in the axial direction of the rotor and a reverse arrangement of the high/intermediate-pressure chamber 10 and the low-pressure chamber 12. Further, the position-adjusting unit 50 is already described in the second embodiment. Thus, components different from the first and second embodiments are mainly described while the components in common with the first and second embodiments are not further described.

Figure 8:
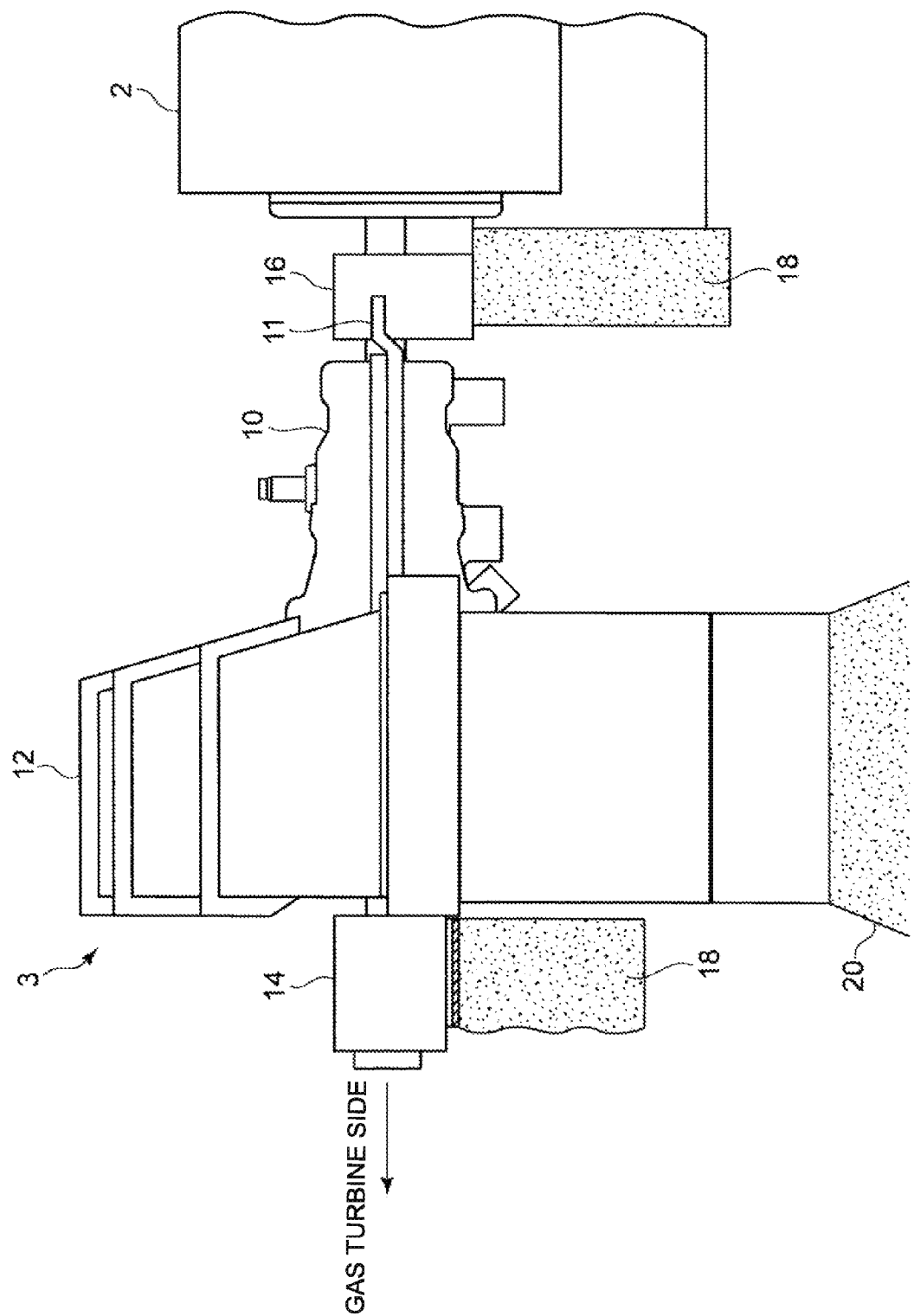
FIG. 8 is a side view of the steam turbine of the single-shaft combined-cycle power plant according to yet another embodiment.

FIG. 8 is a side view of the steam turbine of the single-shaft combined-cycle power plant according to this embodiment. In the steam turbine 60 shown in FIG. 8, the low-pressure chamber 12 is arranged on a side closer to the first bearing housing 14 (i.e. on the side closer to the thrust bearing 15 from which the rotor 9 thermally extends (see FIG. 4)).

The arrangement of the low-pressure chamber 12 on the side closer to the thrust bearing 15 is the same as the conventional single-casing steam turbine. However, the high/intermediate-pressure chamber 10 and the low-pressure chamber 12 are connected to each other by the expansion joint 30 in the same manner as the first embodiment (see FIG. 5). Further, in the same manner as the second embodiment, the position-adjusting unit 50 (see FIG. 6) is provided for adjusting the position of the high/intermediate-pressure chamber 10 in the axial direction of the rotor 9.

According to the third embodiment, the position-adjusting unit 50 is provided so as to freely adjust the position of the high/intermediate-pressure chamber 10 in the axial direction of the rotor 9. Thus the thermal extension difference between the high/intermediate-pressure chamber 10 and the rotor 9 can be canceled out, thereby preventing the rotary part and the stationary part from contacting each other. Therefore, even in the case where the low-pressure chamber 12 fixed by the anchor 20 is arranged on the side closer to the thrust bearing 15, from which the rotor 9 thermally extends, in the manner similar to the conventional steam turbine, it is possible to reduce the clearance between the rotary part and the stationary part in the high/intermediate-pressure chamber 10 and to reliably suppress the performance decline of the high-pressure blade rows 22.

The position of the high/intermediate-pressure chamber 10 can be adjusted by the position-adjusting unit 50 as the low-pressure chamber 12 being the heaviest section is separated from the high/intermediate-pressure chamber 10 (the high/intermediate-pressure chamber 10 and the low-pressure chamber 12 are connected via the expansion joint 30). More specifically, it is possible to adjust the position of the high/intermediate-pressure chamber 10, which is relatively lightweight, as a single unit by the position-adjusting unit 50 using the hydraulic pressure.

While the embodiments of the present invention have been described, it is obvious to those skilled in the art that various changes may be made without departing from the scope of the invention.

For instance, in the above embodiments, the steam turbine 3 is integrated in the combined-cycle power plant 1. However, this is not limitative and the present invention is also applicable to a single-casing steam turbine that is used alone.

REFERENCE SIGNS LIST

1 COMBINED-CYCLE POWER PLANT
2 GENERATOR
3 STEAM TURBINE
4 GAS TURBINE
5 EXHAUST HEAT RECOVERY BOILER
6 STEAM GOVERNING VALVE
7 CONDENSER
8 FEED-WATER PUMP
9 ROTOR
10 HIGH/INTERMEDIATE-PRESSURE CHAMBER
10A UPPER CHAMBER
10B LOWER CHAMBER
11 CASING SUPPORT PART
12 LOW-PRESSURE CHAMBER
14 FIRST BEARING HOUSING
15 THURST BEARING
16 SECOND BEARING HOUSING
17 RADIAL BEARING
18 FOUNDATION
20 ANCHOR
30 EXPANSION JOINT
31 INTERIOR SPACE
32 CONNECTING BLOCK
34 FIXING BOLT
40 HIGH-PRESSURE STEAM
41 HIGH-PRESSURE EXHAUST STEAM
42 REHEAT STEAM
43 LOW-PRESSURE STEAM
44 LOW-PRESSURE EXHAUST STEAM
46 EXHAUST HOOD
50 POSITION-ADJUSTING UNIT
52A HYDRAULIC CYLINDER
52B HYDRAULIC CYLINDER
53 PISTON PART
54 HYDRAULIC UNIT
56 SWITCHING VALVE
58 CONTROL UNIT
59 DIFFERENTIAL EXPANSION INDICATOR
59A TAPER SURFACE
59B NON-CONTACT SENSOR

The invention claimed is:

1. A single-casing steam turbine comprising:
blade rows including at least high-pressure blade rows and low-pressure blade rows;
a high-pressure chamber housing the high-pressure blade rows;
a low-pressure chamber housing the low-pressure blade rows;
an expansion joint connecting the high-pressure chamber and the low-pressure chamber to each other and sealing an interior space of the high-pressure chamber and the low-pressure chamber;
a position-adjusting unit for adjusting a position of the high-pressure chamber in an axial direction of a rotor;
a detection unit for detecting a thermal extension difference between the rotor and the high-pressure chamber; and
a control unit for controlling the position-adjusting unit based on the thermal extension difference detected by the detection unit,
wherein the detection unit includes a sensor for measuring a distance from the sensor to the rotor.

2. The single-casing steam turbine according to claim 1, wherein the position-adjusting unit comprises:
a pair of hydraulic cylinders for moving a casing support of the high-pressure chamber in opposite directions along the axial direction of the rotor, the pair of hydraulic cylinders being attached to the casing support of the high-pressure chamber;
a hydraulic unit for supplying a hydraulic pressure to the pair of hydraulic cylinders; and
a switching valve for switching a hydraulic cylinder to be supplied with the hydraulic pressure between the pair of hydraulic cylinders, the switching valve being provided between the pair of hydraulic cylinders and the hydraulic unit.

3. The single-casing steam turbine according to claim 1,
wherein the rotor has a taper surface outside a casing of the single-casing steam turbine, the rotor changing in diameter along the taper surface, and
wherein the distance from the sensor to the rotor is a distance from the sensor to the taper surface of the rotor.

4. A single-shaft combined cycle power plant comprising a generator, which is coupled to the single-casing steam turbine of claim 1, which is coupled to a gas turbine,
wherein a thrust bearing is provided between the gas turbine and the single-casing steam turbine,
wherein the high-pressure chamber is arranged closer to the thrust bearing than the low-pressure chamber in a casing of the single-casing steam turbine, and
wherein the low-pressure chamber is fixed by an anchor.

5. A single-shaft combined cycle power plant comprising a generator, which is coupled to the single-casing steam turbine of claim 1, which is coupled to a gas turbine,
wherein a thrust bearing is provided between the gas turbine and the single-casing steam turbine,
wherein the low-pressure chamber is arranged closer to the thrust bearing than the high-pressure chamber in a casing of the single-casing steam turbine, and
wherein the low-pressure chamber is fixed by an anchor.

6. The single-casing steam turbine according to claim 1,
wherein the expansion joint is configured to deform in response to thermal extension of at least one of the high-pressure chamber or the low-pressure chamber so as to absorb the thermal extension.

* * * * *